United States Patent [19]

de Sivry et al.

[11] 4,442,867

[45] Apr. 17, 1984

[54] INTERNAL OBTURATORS FOR PIPES

[75] Inventors: Bruno J. M. de Sivry; Jean-Louis Migliarese-Caputi, both of Paris; Daniel Josien, Willems, all of France

[73] Assignee: Compagnie Francaise des Petroles, Paris, France

[21] Appl. No.: 483,747

[22] Filed: Apr. 15, 1983

Related U.S. Application Data

[63] Continuation of Ser. No. 311,802, Oct. 15, 1981, abandoned.

[30] Foreign Application Priority Data

Oct. 29, 1980 [FR] France .................. 80 23089
Feb. 25, 1981 [FR] France .................. 81 03716

[51] Int. Cl.³ ..................................... F16L 55/12
[52] U.S. Cl. ................................................. 138/93
[58] Field of Search ................. 15/104.06 R; 92/201; 134/167 C; 138/90, 93, 97; 166/135, 187, 192, 195; 220/232; 277/9.5, 34, 34.3, 84; 285/109, 110

[56] References Cited

U.S. PATENT DOCUMENTS

| | | | |
|---|---|---|---|
| 1,710,439 | 4/1929 | Taylor | 138/93 |
| 3,034,522 | 5/1962 | Lithun | 138/93 |
| 3,259,192 | 7/1966 | Hyde | 166/187 X |
| 3,294,121 | 12/1966 | Powell et al. | 138/97 |
| 3,604,732 | 9/1971 | Malone | 285/106 |
| 3,690,348 | 9/1972 | Patterson | 15/104.06 R X |
| 3,971,437 | 7/1976 | Clay et al. | 166/187 |

Primary Examiner—Stephen Marcus
Assistant Examiner—Mark Thronson
Attorney, Agent, or Firm—Sughrue, Mion, Zinn, Macpeak and Seas

[57] ABSTRACT

The invention relates to an internal obturator for a pipe for use in separating two spaces inside a pipe. The obturator comprises a rigid hollow body comprising two end plates connected by a cylinder having a lesser diameter than the end plates between which an annular inflatable bladder of a jack is provided extending around the cylinder. The jack is inflated to apply a cylindrical wall against the inner surface of the wall of the pipe. The wall which is independent of the bladder of the jack may be connected by its ends to the end plates or may simply be inserted therebetween.

4 Claims, 2 Drawing Figures

FIG. 1
FIG. 2
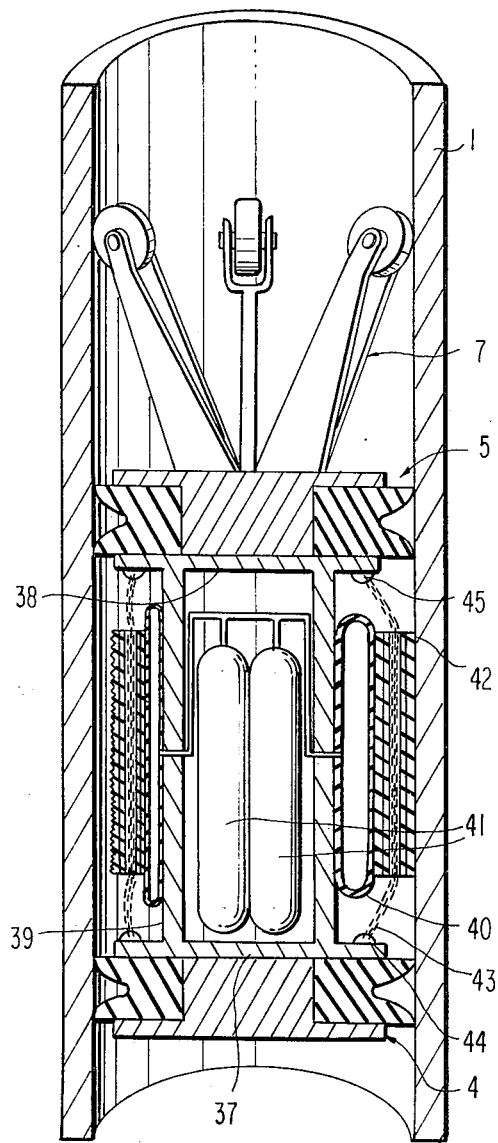
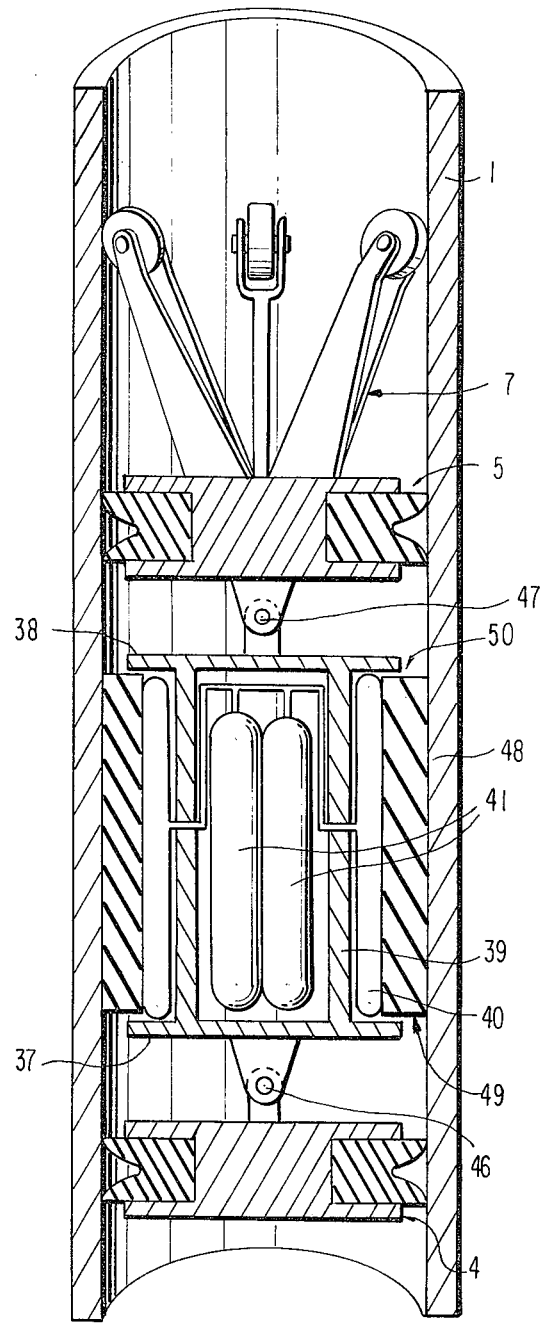

INTERNAL OBTURATORS FOR PIPES

This application is a continuation of application Ser. No. 311,802, filed Oct. 15, 1981, now abandoned.

The invention relates to an obturator adapted to be disposed inside a pipe to isolate from one another two spaces inside the pipe which are located one to each side of the obturator. The invention may be in particular useful in the repair of a submerged hydrocarbon pipeline, for which during the repair it is desired to isolate a section of the pipeline using two such obturators.

It is know that an obturator of this kind can be formed by disposing a series of annular rubber cups and inflatable toric elements as sealing means around a rigid hollow cylindrical element, the obturator being in addition retained in the pipe by catches which contact the inner surface of the wall of the pipe.

According to the invention there is provided an internal obturator for a pipe comprising a rigid hollow cyindrical portion which is bounded by two end plates and a cylinder connecting the two end plates, and around which is disposed an inflatable element for applying a flexible sealing wall of cylindrical shape against the pipe, said sealing wall comprising a cylindrical sleeve independent of said inflatable element and retained at its two ends by said end plates, said inflatable element comprising a single inflatable bladder of annular cross-section, which is inserted between said cylinder and said cylindrical sleeve and is disposed longitudinally over a length close to that of said cylindrical sleeve.

The cylindrical sleeve constituting the sealing wall may be made practically inextensible in the longitudinal direction, for example by embedding in the sealing wall long inextensible members, for example of the chain type, which are disposed in the longitudinal direction of the rigid hollow cylindrical element and which project from the sealing wall at their two ends, where they are attached to the end plates.

Alternatively the cylindrical sleeve constituting the sealing wall may be composed of a deformable cylindrical body simply inserted between the end plates of the rigid hollow cylindrical portion. The sleeve is then compressed against the inside face of the pipe, and against at least one of the end plates of the hollow cylindrical portion when a differential pressure exists across the obturator.

The material constituting the sleeve is advantageously polyurethane.

The radial thickness of the sleeve is selected that under the heaviest axial stresses to which the sleeve is subjected it will, despite the deformation which it then undergoes, still be retained by that end plate of the rigid hollow cylindrical element against which it is pressed.

It has been found that with a sleeve simply inserted between the end plates of the rigid hollow cylindrical portion it was possible to achieve not only leaktightness but also the withstanding of even very high differential pressure forces, for example of the order of 150 bars.

When an obturator has to be moved in the pipe by the fluid pressure, it is possible to inflate the obturator only slightly so as to give it sufficient leaktightness but permit the displacement. In order to avoid all risk of damage to the obturator it is preferred to provide the rigid hollow cylindrical element, at each of its longitudinal ends, with a bidirectional scraper which enables the obturator to be moved in the deflated state. This scraper may advantageously be mounted on the end plate situated at the respective end.

If use is made of a device for measuring the displacement of the obturator in the pipe, the device is preferably connected to one of the scrapers.

Embodiments of the invention will now be described, by way of example only, with reference to the accompanying drawings.

In the drawings:

FIGS. 1 and 2 are views in section of two embodiments of obturators and a portion of a pipe in which the respective obturator is placed.

In these two embodiments the same references are used to designate similar elements.

In FIG. 1 an embodiment of an obturator is shown disposed inside a pipe 1. The operative part of the obturator is disposed longitudinally between two bidirectional scrapers 4 and 5. A device 7 for measuring the displacement of the obturator in the pipe 1 is fixed on the scraper 5. Each of the scrapers 4, 5 comprises a rigid central portion, for example of metal, and a peripheral portion having a certain elasticity, for example of rubber.

The operative part of the obturator is small in size, because the same rigid hollow cylindrical portion comprising and bounded by two metal end plates 37 and 38 joined together by a cylinder 39 has mounted on it both the obturation means and the retaining means. Around this cylinder 39 is installed a flexible single-bladder jack 40 having an annular section and adapted to be supplied with compressed fluid from cylinders 41 of pressurised fluid disposed inside the rigid hollow cylindrical portion. The flexible jack 40 has been shown in the inflated state on one side of the axis of the pipe 1 and in the deflated state on the other side, in order to enable its operation to be better understood, but actually the jack is either inflated or deflated as a whole. The inflation is controlled by a signal transmitted by the displacement measurement device 7 or by any other suitable signal.

A cylindrical wall 42 in the form of a cylindrical sleeve consisting of a fabric-reinforced elastomer having a large number of layers of fabric, which may for example be as many as twelve layers, encloses the jack 40. In the wall 42 are inserted chains 43 disposed longitudinally and fastened at their ends to supports 44 and 45 solid with the end plates 37 and 38. The wall 42 effects the retention of the obturator mainly because of the action of the chains 43, which prevent the shearing of the wall 42 by enabling the shearing stress to be distributed over the entire structure and not only over one face, while the thrust of the jack 40 ensures leaktightness on three surfaces of contact: between the inner surface of the wall of the pipe 1 and the outer face of the wall 42, between the inner face of the wall 42 and the outer face of the jack 40, and between the inner face of the jack 40 and the cylinder 39. The scrapers 4 and 5 have been fixed directly on the end plates 37 and 38.

The bladder of the jack 40 extends longitudinally over a length close to that of the wall 42.

The embodiment of FIG. 2 corresponds to that of FIG. 1 but in this embodiment a cylindrical sleeve forming the wall 48 is simply inserted between the two metal end plates 37 and 38. The scraper 5 is fixed to the device 7 for measuring the displacement of the obturator in the pipe, but the scrapers 4 and 5 are connected to the end plates 37 and 38 respectively by joints 46 and 47.

The sleeve forming the sealing wall 48 comprises a thick hollow cylinder of an elastomer, which may be reinforced by metal rods directed longitudinally. For the construction of this sleeve, use may in particular be made of materials available commercially under the names "ALPAX" and "VULKOLAN". In the example selected the sleeve is made of polyurethane. The axial length of the sleeve may be substantially equal to or (in the case of axial pre-stressing) greater than the distance between the end plates 37 and 38, when it is at rest. The sleeve 48 is simply inserted between the end plates 37 and 38. On its inner face it is bordered by the flexible jack 40, while its outer face, in the state of rest, has a diameter very slightly smaller than the inside diameter of the pipe 1 and is very powerfully applied against the inner surface of the pipe 1 when the jack 40 is inflated and crushes the sleeve 48.

Sealing is achieved on three surfaces of contact: between the cylinder 39 and the flexible jack 40, between the flexible jack 40 and the sleeve 48, and between the sleeve 48 and the pipe 1.

The flexible jack 40 can be inflated by a fluid or by a thermosetting resin.

The axial end portions 49 and 50 of the sleeve 48 which are applied against the end plates 37 and 38 respectively may be made of a stronger material than that of which the remainder of the sleeve is made, such as a thermosetting resin, so as to reinforce the sleeve in the regions subjected to the heaviest stressing.

There is thus provided an internal obturator having a reduced number of parts necessary to obtain excellent leaktightness at the same time as good retention of the obturator in the pipe, and consequently of reduced cost and size. Additionally all parts retaining the obturator which entail the risk of damaging the inside wall of the pipe have been eliminated.

What is claimed is:

1. An internal obturator for a pipe, comprising: a rigid hollow cylindrical unit defined by a hollow central cylinder (39) closed at its opposite ends by two circular plates (37, 38) having annular flanges extending radially outwardly beyond said cylinder, an elongated torus shaped inflatable element (40) disposed around said cylinder, and a flexible sealing wall (48) of cylindrical shape disposed around said inflatable element for sealing application thereby against the internal wall of a pipe, said sealing wall comprising a cylindrical sleeve independent of said inflatable element and retained at its two ends against longitudinal displacement by said circular plates, said inflatable element comprising a single inflatable bladder of annular cross-section inserted between said cylinder and said cylindrical sleeve and having a length approximately the same as that of said cylindrical sleeve, wherein said cylindrical sleeve comprises a deformable cylindrical body freely inserted between said end plates, the axial length of said cylindrical sleeve substantially corresponds to the axial distance between said circular plates, and the portions of the axial ends of said cylindrical sleeve which are, in use, applied against said end plates are made of a stronger material than that of which the remainder of said sleeve is made.

2. An obturator according to claim 1, wherein said cylindrical sleeve is made of polyurethane.

3. An obturator according to claim 1, wherein said stronger material is a thermosetting resin.

4. An obturator according to claim 1, further comprising fluid pressure source means (41) disposed within said cylinder for selectively inflating said bladder.

* * * * *